United States Patent [19]

Yeh

[11] Patent Number: 4,959,464

[45] Date of Patent: Sep. 25, 1990

[54] PROCESS FOR DERIVATIZING POLYGALACTOMANNAN USING WATER SOLUBLE ALUMINUM SALTS IN THE PROCESS

[75] Inventor: Michael H. Yeh, Louisville, Ky.

[73] Assignee: Hi-Tek Polymers, Inc., Jeffersontown, Ky.

[21] Appl. No.: 268,287

[22] Filed: Nov. 7, 1988

[51] Int. Cl.$^5$ ............................................. C07H 1/00
[52] U.S. Cl. .................... 536/114; 536/121; 536/124
[58] Field of Search ............... 536/114, 124, 52, 121; 556/55

[56] References Cited

U.S. PATENT DOCUMENTS

| | | | |
|---|---|---|---|
| 3,301,723 | 1/1967 | Chrisp | 149/20 |
| 3,723,409 | 3/1973 | Yueh | 260/209 |
| 3,808,195 | 4/1974 | Shelso et al. | 260/209 R |
| 4,051,317 | 9/1977 | Towe | 536/114 |
| 4,605,736 | 8/1986 | Morgan | 536/114 |

FOREIGN PATENT DOCUMENTS 2036055 6/1980 United Kingdom .

OTHER PUBLICATIONS

Moore, Walter J. 1962, *Physical Chemistry* 3rd Edition. Prentice-Hall, Inc. Englewood Cliffs, N. J.
The Merck Index, Ninth Edition. pp. 367, 1350.
The CRC Handbook of Chemistry and Physics 62nd Edition. pp. F-180-F-184.
Journal of Chemical Society, Kerr and Troutman-Dickenson, Dec., 1964, pp. 4669-4676.

*Primary Examiner*—John W. Rollins
*Assistant Examiner*—Gary L. Kunz
*Attorney, Agent, or Firm*—Herbert P. Price

[57] ABSTRACT

In an aqueous process for derivatizing polygalactomannan gums, the derivatized product prior to washing is reacted with a water soluble aluminum salt. The resulting products hydrate readily under alkaline pH conditions.

11 Claims, No Drawings

PROCESS FOR DERIVATIZING POLYGALACTOMANNAN USING WATER SOLUBLE ALUMINUM SALTS IN THE PROCESS

BACKGROUND OF THE INVENTION

The field of art to which this invention pertains is polygalactomannans and derivatives thereof.

Derivatives of polygalactomannans, such as the hydroxyalkyl ether, alkyl ether, carboxyalkyl ethers, aminralkyl ether and quaternary ammonium alkyl ether derivatives, are well known compounds and various methods for preparing the derivatives have been described.

The hydroxyalkyl ethers of polygalactomannans are prepared by reacting the polygalactomannan with an alkylene oxide or an alkylene chlorohydrin under basic conditions. In U.S. Pat. Nos. 3,723,408 and 3,723,409, guar flour is reacted with alkylene oxides in the presence of water and sodium hydroxide. The reaction product is then neutralized with acid, washed with an alcohol-water mixture, and is then dried and ground. In U.S. Pat. No. 3,483,121, the polygalactomannan and the alkylene oxide are reacted under basic conditions with small amounts of water and larger amounts of water miscible or water immiscible organic solvents.

Carboxyalkyl ethers and mixed carboxyhydroxyalkyl ethers of polygalactomannans are described in U.S. Pat. Nos. 3,740,388 and 3,723,409, respectively. These derivatives are made by reacting the polygalactomannan with the derivatizing agents (halofatty acid and alkylene oxide) in a water-alcohol mixture followed by washing with a water-alcohol mixtures.

Other derivatives of polygalactomannans are described in such patents as U.S. Pat. No. 2,461,502 (cyanoethyl ethers), U.S. Pat. No. 4,094,795 (dialkylacrylamide ethers) and U.S. Pat. No. 3,498,912 (quaternary ammonium alkyl ethers). In the described processes, the reactions are conducted in water-organic solvent mixtures and the reaction products are washed with solvents or water-solvent mixtures.

In order to avoid the use of volatile flammable organic liquids and to eliminate the need to recover such organic liquids when the reactions are completed, commercial processes have been developed which use only water as the reaction medium. In such processes, the gum endosperm of the polygalactomannan is reacted with the derivatizing agent under alkaline catalysis using sufficient water to swell the endosperm. The resulting products are then washed to remove unreacted derivatizing agent, caustic, salt and by-products. During the washing step, care must be exercised to avoid forming gels which are extremely difficult to handle and to avoid washing away product.

The water washing problems have been minimized to a great extent by adding borax at the end of the reaction or in the wash water. Borax, under basic pH conditions, will complex with polygalactomannans to form crosslinked gels. Small amounts of borax in the derivatizing reaction will complex and crosslink the surface of the swollen endosperm particles so that absorption of water and solubilization of the particles is inhibited. The use of borax increases the efficiency of the process. However, the disadvantage of the process is that the resulting polygalactomannan products have a slow hydration rate under high pH conditions.

SUMMARY OF INVENTION

This invention is directed to a process for derivatizing polygalactomannans. In one aspect, this invention pertains to a process for derivatizing polygalactomannans under aqueous conditions. In another aspect, this invention relates to derivatives of polygalactomannans which are hydratable under alkaline conditions.

By the process of this invention, derivatives of polygalactomannans are prepared by reacting the gum endosperm of the polygalactomannan with a derivatizing agent under aqueous alkaline conditions, treating the reaction product with a water soluble aluminum salt, washing the treated product with water, and recovering the derivatized polygalactomannan.

DESCRIPTION OF INVENTION

The process of this invention is particularly applicable to polygalactomannan gums, which gums are polysaccharides composed principally of galactose and mannose units. The galactomannans are usually found in the endosperm of leguminous seeds, such as guar, locust bean, honey locust, flame tree, Kentucky coffee tree, and the like. The particularly preferred polygalactomannan for use in the process of this invention is obtained from guar beans.

The basic unit of the galactomannan polymer in guar gum contains two mannose units with a glycosidic linkage and a galactose unit attached to one of the hydroxyls of the mannose unit. On the average, each of the sugar units has three available hydroxyl sites, all of which can react. The extent of reaction or derivatization of the hydroxyl groups is referred to either as molar substitution (M.S.) which is the number of units (moles of derivatizing agent) which has reacted per sugar unit of the polygalactomannan, or degree of substitution (D.S.) which is the average number of hydroxy groups of the sugar units that has been reacted with the derivatizing agent.

The guar endosperm as used in this invention is commonly referred to as "purified splits", or "double purified splits" depending upon the degree of purification. "Purified splits" are obtained by mechanical separation of the endosperm from the hull and germ of the guar seed in as pure and intact a form as possible with no other processing steps. These purified splits contain, as impurities, about 6–12 percent moisture, 2–7 percent protein and 2–7 percent acid insoluble residue. They have a particle size range of about 4 to about 20 mesh (U.S. Standard Sieve Series).

The guar particles are reacted with the various derivatizing agents under aqueous alkaline conditions. Any of the alkali metal hydroxides can be used, but the preferred one is sodium hydroxide. Water is the only reaction medium with no organic solvents being used in the process.

The derivatizing agents used in the process of this invention are the well known alkylating or etherifying agents which contain groups which can react with the hydroxyl groups of the polygalactomannans to form ether groups, such reactive groups being vicinal epoxide groups, halogen atoms, or ethylenic unsaturated groups. Examples of such agents are alkylating agents, hydroxyalkylating agents, carboxyalkylating agents, aminoalkylating agents, quaternary ammonium alkylating agents, cyano alkylating agents, amidoacrylating agents and the like. Alkylating agents include methyl chloride, methyl bromide, ethyl chloride, ethyl iodide and isopropyl chloride. Hydroxyalkylating agents include ethylene oxide, propylene oxide-1,2,butylene oxide-1,2, hexylene oxide-1,2, ethylene chlorohydrin, propylene chlorohydrin, and epichlorohydrin. Examples of carboxyalkylating agents are chloroacetic acid, chloropropionic acid, and acrylic acid. Aminoalkylating agents include amincethyl chloride, aminopropyl bromide, N,N-dimethyl-aminopropyl chloride and the like. Quaternary ammonium alkylating agents are such agents as 2,3-epoxypropyl trimethylammonium chloride, 3-chloro-2-hydroxypropyl trimethyl ammonium chloride and the like. Ethylenically unsaturated group containing agents which react through Michael addition with hydroxyl groups are acrylamide, methacrylamide, acrylonitrile, xethacrylonitrile, acrylic acid, sodium acrylate, and any of the polymerizable monomers which contain one ethylenically unsaturated polymerizable group.

The derivatizing reaction is conducted in a reactor capable of withstanding vacuum and moderate pressures and is equipped with means for agitating the reactants. Air is excluded from the reactor in order to prevent oxidation of the galactomannan polymer to lower molecular weight species so as to preserve the viscosity properties of the final product. The reaction is conducted under an inert gas, e.g., nitrogen, atmosphere. The polygalactomannan particles, alkali and derivatizing agent are added to the reactor with sufficient water to swell the polygalactomannan particles but not to solubilize them. Generally, the amounts of reactants, on a weight basis, used for each 100 parts of polygalactomannan gum (on a dry basis) will range from about 7.5 to about 300 parts of water (including water in the gum), about 5 to about 300 parts of derivatizing agent, and alkali, either in catalytic amounts, or in a slight excess over stoichiometric amounts if the derivatizing agent contains active halogen atoms or acid groups.

The derivatizing reactions are generally conducted at ambient temperatures up to about 250° F. for a time sufficient to complete the reaction, about 0.5 to about 24 hours. The reaction is conducted under gentle mixing or tumbling agitation so as to continually expose the surfaces of the gum particles to the derivatizing agent and to keep a uniform temperature throughout the reactor without exerting shearing forces on the particles so as to grind or smear them.

The product after the derivatizing stage contains, in addition to the derivatized polygalactomannan, unreacted alkali, alkali salts, unreacted derivatizing agent, hydrolyzed derivatizing agent and water. The derivatized polygalactomannan is contacted with water to extract and wash out the undesirable by-products. The washing stage is conducted by well known processes as slurry and decantation, counter current washing, and centrifuging. During the washing stage, the polygalactomannan particles absorb water and if the washing is not properly controlled, the particles will become jelly like and will actually dissolve in the water. In order tn be handled and processable, the water content of the particles, as measured after centrifugation, should not exceed about 77 weight percent. If the polygalactomannan derivatives are treated with a small amount of borax before or during the washing step, the surface of the polygalactomannan is crosslinked, thereby decreasing the ability of the particle to absorb more water and also helping to retain the integrity of the particle. As described in U.S. Pat. No. 3,808,195, when borax and polygalactcmannan particles are added to water, the borax retards the development of stickiness on the particles' surfaces by forming a thin film of crosslinked polymer on the surface. Although the use of borax is helpful in the processing of polygalactomannan derivatives, its presence in the polymer is disadvantageous for many subsequent uses due to the slow hydration rate of the derivatives at alkaline pH.

According to the process of this invention, a water soluble aluminum salt is mixed with the products and by-products of the derivatizing stage either before the washing step or during the washing step. The aluminum ion crosslinks the surface of the polygalactomannan particles, thereby inhibiting the absorption of water into the particle and reducing the stickiness of the surface of the particles in a manner similar to borax. However, the resulting derivative products have fast hydration rates at alkaline pH and can be used as a thickening agent in many applications where alkaline pH has been a problem.

The aluminum salts useful in this invention are any of the water soluble aluminum salts which ionize in water to the trivalent aluminum ion. Examples of such aluminum salts are aluminum nitrate, aluminum sulfate, aluminum acetate, aluminum ammonium chloride, aluminum ammonium sulfate, aluminum bromide, aluminum chloride, aluminum iodide, sodium and potassium aluminates and the likes. Preferred aluminum salts are aluminum acetate and aluminum sulfate.

The aluminum salts are added to the reactor as an aqueous solution generally at a concentration in water of about 0.1 to about 5 weight percent. The amount of aluminum reacted with the polygalactomannan derivative is about 0.005 to about 0.5 weight percent, preferably, about 0.005 to about 0.15 aluminum ion based on the weight of the polygalactomannan present at the beginning of the reaction.

The aqueous solution of aluminum salt when added to the reaction product at the end of the derivatization reaction is thoroughly mixed with the reaction product so that surface crosslinking takes place in a uniform manner. The aqueous solution of aluminum salt can also be added as part of the initial wash water so that the aluminum ions can contact the guar particles and form crosslinking bonds on the surface.

After the addition of the aluminum salt, the guar derivatives are washed with additional water to remove impurities and are then centrifuged to remove water followed by flash grinding i.e., grinding the material and at the same time evaporating moisture using heat. Flash grinding can be conducted in a hammer mill through which heated air is passed.

The derivatized polygalactomannans obtained by the process of this invention hydrate in water under alkaline pH conditions at a much faster rate than products made using borax in the reaction process.

The following examples described the invention in more detail. Parts and percentages are by weight unless otherwise indicated.

EXAMPLE 1

To a suitable reactor were added 2000 parts of water and 168 parts of 50 percent aqueous sodium hydroxide. Agitation was begun and the temperature was raised to 155° F. Double purified guar splits, 2000 parts, were added, the reactor was sealed, was purged with nitrogen and was evacuated three times. Propylene oxide, 540 parts, was added while controlling the pressure rise to about 10 psig. After about 30 to about 60 minutes, the pressure dropped to 0 indicating complete reaction of the propylene oxide. Heat was removed and when the temperature reached 100° F., the product was discharged.

The product was divided into three equal parts. To the first part (Ex. 1A), 1 part of aluminum chloride and 100 parts of water were added. To a second part (Ex. 1B), 2 parts of aluminum chloride and 100 parts of water were added. To the third part (Ex. 1C), 2.5 parts of aluminum chloride and 100 parts of water were added. Each part was thoroughly mixed and was then washed three times with water, decanting the water each time. Each product was then centrifuged and the moisture content was determined. The products were then milled and dried to a moisture content of about 10 percent.

Double purified splits were reacted with propylene oxide using the same procedure as described hereinbefore except no aluminum ion was added (Ex. 1D). The product had a high post centrifuge moisture content and was too soft and gel like to be milled.

The amount of aluminum chloride, weight percent based on weight of guar at start of the reaction, and the post centrifuge moisture content (PC Moisture) are shown in Table 1.

TABLE 1

| Example | Aluminum Cl % | P.C. Moisture % |
|---|---|---|
| 1A | 0.15 | 75.9 |
| 1B | 0.30 | 74.9 |
| 1C | 0.45 | 73.9 |
| 1D | 0 | 80.2 |

EXAMPLE 2

Each of the aluminum containing products described in Example 1 was added to water containing 2 percent potassium chloride and buffered to a pH of 8.5 with monosodium dihydrogen phosphate and sodium hydroxide. The gum was added at a concentration of 1.9 g per 400 ml of the aqueous solution. The rate of hydration was determined by measuring the viscosity, expressed in centipoise, with a Fann 35A Viscometer. The hydration rates are shown in Table 2.

TABLE 2

| Ex. | 2 min | 5 min | 10 min | 30 min | 60 min |
|---|---|---|---|---|---|
| 1A | 25.6 | 31.4 | 32.4 | 33.8 | 34.4 |
| 1B | 26.4 | 32.2 | 33.2 | 34.2 | 34.8 |

TABLE 2-continued

| Ex. | 2 min | 5 min | 10 min | 30 min | 60 min |
|---|---|---|---|---|---|
| 1C | 23.8 | 31.4 | 33.6 | 34.2 | 34.2 |

The principles, preferred embodiments, and modes of operation of the present invention have been described in the foregoing specification. The invention which is intended to be protected herein, however, is not to be construed as limited to the particular forms disclosed, since they are to be regarded as illustrative rather than restrictive. Variations and changes may be made by those skilled in the art without departing from the spirit and scope of the invention.

What is claimed is:

1. In a process for preparing derivatives of a polygalactomannan gum which comprises reacting the gum particles with a derivatizing agent in aqueous medium followed by the steps of washing with water and drying, the improvement which comprises reacting the gum with a water soluble aluminum salt after the derivatizing reaction and prior to the washing step, whereby the surface of the gum particles is crosslinked, thereby inhibiting absorption of the wash water into the gum particles.

2. The process of claim 1 wherein the polygalactomannan gum is guar gum.

3. The process of claim 2 wherein the guar gum is in the form of splits.

4. The process of claim 1 wherein the aluminum salt is reacted in the amount of about 0.005 to about 0.5 weight percent aluminum ion based on the weight of polygalactomannan gum prior to derivatizing.

5. The process of claim 4 wherein the aluminum salt is reacted in the amount of about 0.005 to about 0.15 wight percent aluminum ion.

6. The process of claim 4 wherein the aluminum salt is aluminum chloride.

7. The process of claim 4 wherein the aluminum salt is aluminum sulfate.

8. The process of claim 1 wherein the derivatizing agent is an etherifying agent.

9. The process of claim 8 wherein the derivatizing agent contains vicinal epoxide groups, halogen atoms, or ethylenically unsaturated groups.

10. The process of claim 9 wherein the derivatizing agent is propylene oxide.

11. A polygalactomannan gum derivative hydratable under alkaline conditions obtained by the process of claim 1.

* * * * *